United States Patent [19]

Miura et al.

[11] Patent Number: 5,478,405
[45] Date of Patent: Dec. 26, 1995

[54] METHOD AND APPARATUS FOR CLEANING CYLINDRICAL OUTER SURFACE OF A DISK FOR MANUFACTURING DISK-TYPE INFORMATION RECORDING MEDIUM AND A DISK-TYPE INFORMATION RECORDING MEDIUM MADE BY USING A DISK CLEANED BY SAID METHOD OR APPARATUS

[75] Inventors: Hitoshi Miura, Yokohama; Tadahiko Mizukuki, Tokyo, both of Japan

[73] Assignee: Mitsui Toatsu Chemicals, Inc., Tokyo, Japan

[21] Appl. No.: 288,866

[22] Filed: Aug. 11, 1994

Related U.S. Application Data

[62] Division of Ser. No. 995,713, Dec. 23, 1992, Pat. No. 5,375,285.

[30] Foreign Application Priority Data

Dec. 26, 1991 [JP] Japan ................................. 3-344921

[51] Int. Cl.$^6$ .................................................... G03G 21/00
[52] U.S. Cl. ................................... 134/9; 134/33; 15/97.1
[58] Field of Search ................................. 134/9, 32, 33, 134/40, 41, 137, 139, 157; 15/97.1, 99, 103.5

[56] References Cited

U.S. PATENT DOCUMENTS 3,615,813 10/1971 Clarke et al. ........................... 134/9
3,862,801 1/1975 Komp ................................. 15/103.5

*Primary Examiner*—Scott Kastler
*Attorney, Agent, or Firm*—Oblon, Spivak, McClelland, Maier & Neustadt

[57] ABSTRACT

The present invention relates to a method and apparatus for manufacturing a disk-type information recording medium such as an optical disk. The method and apparatus of the present invention involves the concept of automatically removing any surplus organic materials deposited on cylindrical outer surfaces of the disk and also provides for a disk-type information recording medium of a high quality finish. In the method and apparatus of the present invention, a cleaning belt is utilized to contact a disk which is positioned on a rotatable cleaning table to remove any organic materials existing on the cylindrical outer surface of the disk.

8 Claims, 1 Drawing Sheet

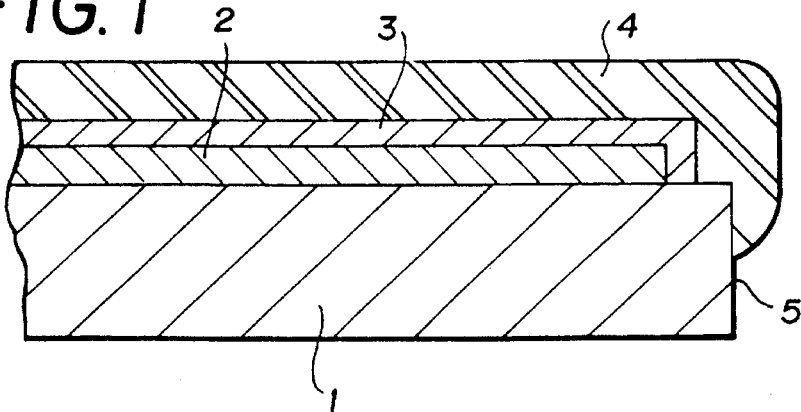
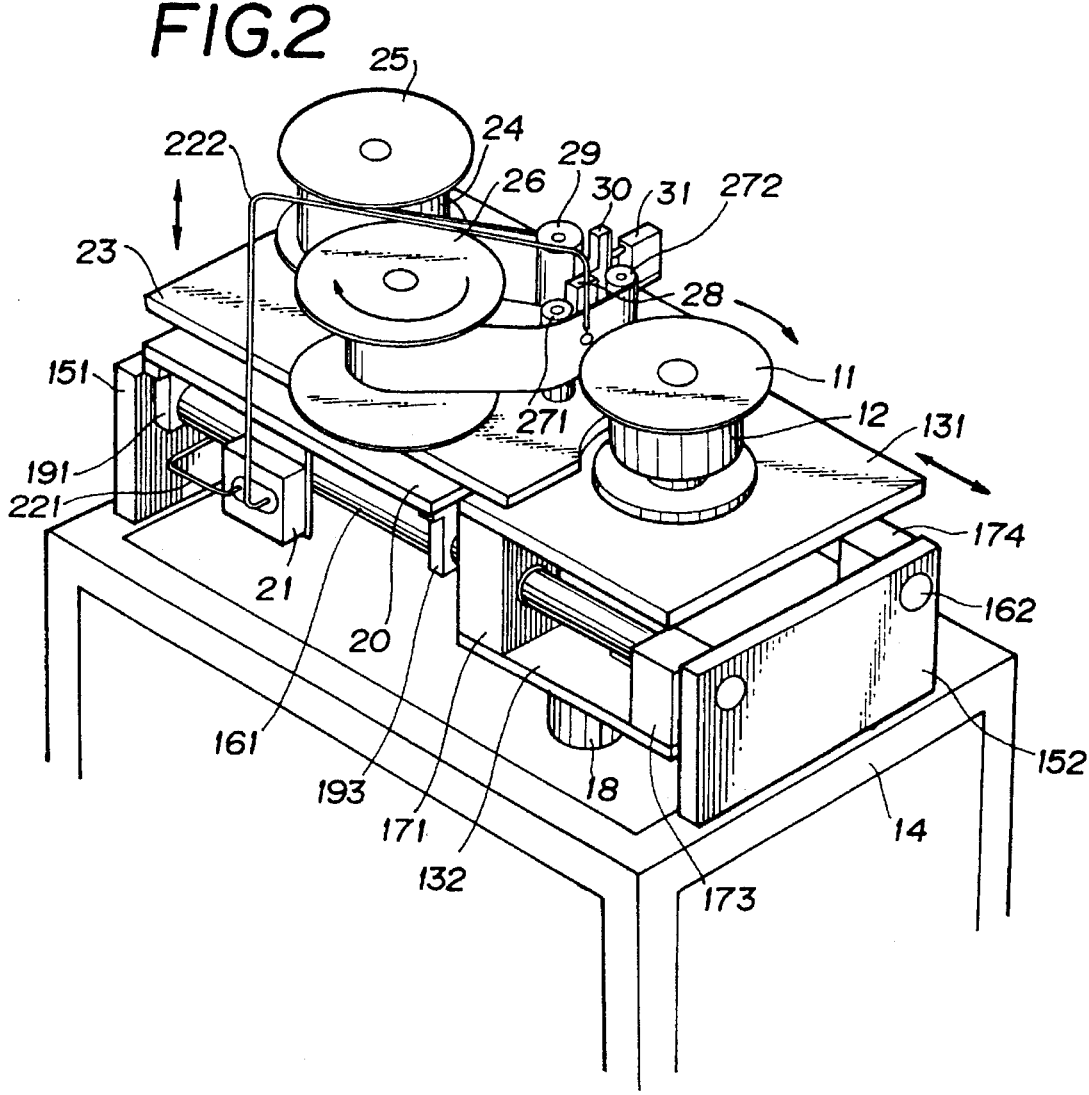

METHOD AND APPARATUS FOR CLEANING CYLINDRICAL OUTER SURFACE OF A DISK FOR MANUFACTURING DISK-TYPE INFORMATION RECORDING MEDIUM AND A DISK-TYPE INFORMATION RECORDING MEDIUM MADE BY USING A DISK CLEANED BY SAID METHOD OR APPARATUS

This is a division, of application Ser. No. 07/995,713, filed on Dec. 23, 1992, now U.S. Pat. No. 5,375,285.

FIELD OF THE INVENTION

The invention relates to method and apparatus for manufacturing a disk-type information recording medium such as an optical disk or the like and, more particularly, to a method in which while sequentially laminating an organic dye layer, a reflective layer, and a protective layer on to the surface of a disk-type or doughnut-type substrate to manufacture an optical recording disk, after the organic dye layer was formed on the surface of the substrate and before the reflective layer and protective layer are laminated, a pollutant deposited on the cylindrical outer surface is eliminated. The invention further relates to an apparatus for carrying out such a method and an intermediate product or a product manufactured by using such a method or apparatus.

BACKGROUND OF THE INVENTION

As mentioned above, since the invention relates to a treatment of the substrate having the organic dye layer on the surface, in the specification, the intermediate product in this state is simply referred to as a disk and is distinguished from an intermediate product at the other steps and a finished product.

That is, in the specification, it is assumed that the mere word "disk" denotes the intermediate product which has the organic dye layer on the surface of the substrate and none of the reflective layer and the protective layer is formed on the organic dye layer.

In the specification, although the outer peripheral surface of the disk is described to be the cylindrical surface, it is assumed that the cylindrical surface includes a chamfered surface, a surface having rounded corners and the like.

The optical recording disk which is formed by laminating the organic dye layer, reflective layer and protective layer in serial order on to the substrate is disclosed in, for instance, "Optical Data Storage 1989", Technical Digest Series Vol.1 45, 1989, or the like and is well known.

The optical recording disk is widely put into practical use because the information recorded on the disk can be easily reproduced by a compact disc player which is generally commercially available.

When the optical recording disk is manufactured, the organic dye layer is formed on the substrate by a spin coating method, a dipping method, a sputtering method, a vacuum deposition method, or the like. In this case, however, organic materials forming the organic dye layer are undesirably deposited and remain on the cylindrical outer surface of the disk.

When the disk on the cylindrical outer surface of which organic materials are deposited and remain is used to obtain a medium, an appearance of the medium becomes worse, which makes the medium commercially very low value.

When such a disk is handled by fingers of a worker or a chuck of a robot, if the fingers or the chuck comes into contact with the cylindrical outer surface of the disk, the fingers or chuck is polluted by the organic materials, and the deposited materials result in the generation of floating dust.

Further, although the reflective layer and the protective layer are formed on the organic dye layer, the protective layer generally covers a part of or all of the cylindrical outer surface of the substrate. The outermost periphery of the surface of the substrate should have no organic dye layer nor the reflective layer, in order to obtain strong adhesion of the protective layer to the substrate. Further, the organic materials should be removed away from the cylindrical outer surface, thereby allowing the protective layer to be directly adhered onto the clean surface of the substrate. However, if organic materials such as organic dye or the like are deposited and remain on the cylindrical outer surface of the substrate, in such a portion, an adhesion of the protective layer to the substrate becomes poor.

When organic materials such as dye or the like are deposited and remain on the cylindrical outer surface of the substrate as mentioned above, various problems occur. Therefore, the organic materials deposited in such a portion must be completely removed.

Hitherto, we removed away such surplus materials by a manual work by using a cloth with a solvent.

Such a cleaning method, however, provides many problems. For example, much labors and a long time are needed, it is difficult to control the quality, a large amount of floating dust is raised in the work environment, the substrate surface may be damaged during the work, it is harmful from a viewpoint of labor health, and the like.

A method of mechanically cutting and finishing the cylindrical outer surface of such a disk-type substrate has been disclosed in JP-A-4-67333, though the object of the invention is different from that of the present invention.

The organic materials deposited on the cylindrical outer surface of the disk can be also removed by the above cutting and finishing method. According to such a method, however, it is difficult to collect the floating dust generated upon cutting and it is almost impossible to completly remove the generated floating dust.

When such floating dust falls and is deposited onto the organic dye layer formed, further, there occurs serious problems such as defects in the reflective layer or protective layer and in uniformity of of their layers thicknesses.

SUMMARY OF THE INVENTION

The invention is made to solve the above problems and it is an object of the invention to provide a method and apparatus for cleanly finishing such disks by automatically removing away surplus organic materials deposited on the cylindrical outer surfaces of the disks in a closed working place and also to provide a disk-type information recording medium of a high quality finished by such a method or apparatus.

The above first subject is accomplished by a method of cleaning a cylindrical outer surface of a disk which comprises a disk-type substrate having an organic dye layer on its surface for manufacturing a disk-type information recording medium, said method comprising the steps of:

intermittently or continuously moving a long cleaning belt along a desired path in its longitudinal direction to give a virgin potion thereof;

supplying a solvent capable of dissolving organic materials forming the organic dye layer to the virgin portion of the cleaning belt;

setting a disk on a rotatable cleaning table;

removing the organic materials away from the cylindrical outer surface of the disk by contacting the surface with the cleaning belt supplied with the solvent while rotating the disk; and taking the disk off the cleaning table.

The above second subject is attained by an apparatus for cleaning a cylindrical outer surface of a disk for manufacturing a disk-type information recording medium with an organic dye layer on its surface, said apparatus comprising:

means for feeding a cleaning belt;

means for moving the cleaning belt in the longitudinal direction along a desired path;

means for taking in the cleaning belt;

means for supplying a solvent capable of dissolving organic materials forming the dye layer to the cleaning belt moving along said desired path;

a cleaning table on which a disk to be processed is set and which can rotate said disk around its central axis;

means for contacting the cleaning belt wetted by the solvent with the cylindrical outer surface of the disk which is set on the cleaning table and is being rotated, thereby removing away the organic materials existing on the cylindrical outer surface of the disk; and means for controlling the operation of each of said means.

Further, in order to effectively use a cleaning belt, it is recommended that the apparatus is provided with a mechanism for moving backwardly the used cleaning belt; and a mechanism for moving at least either one of the cleaning belt and a disk to be processed in such a direction as to traverse the cleaning belt, thereby allowing a virgin portion of the belt to be come into contact with the cylindrical outer surface of the disk.

The above third subject is realized by a disk-type information recording medium manufactured by using the above method.

BRIEF DESCRIPTION OF THE DRAWINGS

An embodiment of the invention will be described in detail hereinbelow with reference to the drawings in which:

FIG. 1 is a partially enlarged cross sectional view, illustrating a structure of a disk-type information recording medium, according to the present invention; and FIG. 2 is a perspective view showing an embodiment of an apparatus of the invention.

DESCRIPTION OF THE PREFERRED EMBODIMENTS

Referring to FIG. 1, reference numeral 1 denotes a substrate; 2 an organic dye layer; 3 a reflective layer; 4 a protective layer; and 5 a cylindrical outer surface of the substrate.

The organic dye layer 2, reflective layer 3 and protective layer 4 are sequentially laminated on the surface of the substrate 1.

Although the organic dye layer 2 should be removed in the outermost periphery of the surface of the substrate and the cylindrical outer surface 5, the invention relates to a technique for removing the organic dye layer 2 from the cylindrical outer surface 5.

An embodiment of an apparatus according to the invention will now be further practically explained in detail with reference to FIG. 2.

In FIG. 2, reference numeral 11 denotes a disk to be processed by the apparatus; 12 a cleaning table on which the disk 11 is put; 131 and 132 movable tables for supporting the cleaning table 12 and its rotary shaft; 14 a frame made by an equilateral angle bar; 151 and 152 fixed walls perpendicularly attached to the frame 14; 161 and 162 one pair of guide bars whose both ends are supported by fixed walls 151 and 152; 171, 172, (not shown in the drawing), 173, and 174 linear bearings which support the movable tables 131 and 132 and slide along the guide bars 161 and 162; 18 a motor for rotating the cleaning table 12 at a high speed in the direction shown by an arrow; 20 a horizontally movable table which is slidably attached to the guide bars 161 and 162, through holders 191, 192 (not shown), 193 and 194 (not shown); 21 a solvent supply pump of a piezoelectric vibration type; 221 and 222 solvent supply pipes made by stainless steel; 23 an elevation table which is supported by the horizontally movable table 20 and is elevated up or down by an apparatus (not shown); 24 a cleaning belt; 25 a feed drum of the cleaning belt; 26 a recovery drum of the used cleaning belt; 271 and 272 guide rollers with flanges for guiding the running of the cleaning belt 24; 28 a pressure applying member for pushing the cleaning belt 24 against the cylindrical outer surface of the disk 11 at a predetermined pressure; 29 a guide roller with a flange which is provided to restrict a height of running path of the cleaning belt 24; 30 a pressure applying member made of elastomer such as an urethane rubber which is provided to allow the cleaning belt 24 to come into pressure contact with the guide roller 29; and 31 an air cylinder for pushing the pressure applying member 30 against the guide roller 29.

Although not shown, the operations of the above component elements are controlled by a central operating unit. An encoder and a sensor are provided for each section in order to check the movement of all the movable elements. Outputs of those encoders and sensors are fed back to the central operating unit.

It is recommended that among those component elements, the component elements which do not particularly need a high strength and a high abrasion resistance, for example, the movable tables 131 and 132, fixed walls 151 and 152 and the like may be made of aluminum alloy and on the other hand the component elements which need abrasion resistance, a high strength and a corrosion resistance, for instance, the solvent supply pipes 221 and 222, guide rollers 271 and 272 and the like may be preferably made of stainless steel or the like.

The fixed walls 151 and 152 are perpendicularly fixed to the frame 14 and support the pair of guide bars 161 and 162.

The movable tables 131 and 132 are attached respectively to the upper and lower end surfaces of the linear bearings 171, 172, 173, and 174 which can be moved along the guide bars 161 and 162. The cleaning table 12 is attached to the upper movable table 131. The motor 18 to rotate the cleaning table 12 is attached to the lower movable table 132. A work table is formed by those component elements. The work table may be reciprocated along the guide bars 161 and 162 by an actuator (not shown) attached to the fixed wall 151.

A rotational speed of the disk 11 may be set to any speed so long as an enough cleaning effect is obtained. However, it is preferably set to 10 to 100 r.p.m. (rotations per minute), more preferably, 20 to 50 r.p.m.

The cleaning table 12 is provided with a vacuum chucking apparatus for attracting the disk 11. Further, a conveying apparatus of the disk 11 is provided over the vacuum chucking apparatus. The disk 11 is set on the upper surface of the cleaning table 12 by those apparatuses.

The guide bars 161 and 162 further support the horizontally movable table 20 through the holders 191, 192, 193 and 194. The elevating table 23 is supported above the horizontally movable table 20 through an elevating apparatus (not shown) so that it can be freely elevated.

The feed drum 25 of the fresh cleaning belt, recovery drum 26 of the used cleaning belt, and guide rollers 271, 272 and 29 with flanges are provided over the elevating table 23. Further, the recovery drum 26 of the cleaning belt is adapted to be intermittently rotated in the direction shown by an arrow in the drawing by a motor (not shown).

The guide rollers 271 and 272 are attached on the horizontally movable table 20 so that an interval between the cylindrical outer surface of the disk 11 and the cleaning belt 24 can be changed to adjust the contact width therebetween.

Since the motor for rotating the recovery drum 26 is provided between the horizontally movable table 20 and the elevating table 23, it is desirably thin and compact. Further, since such a motor drives the recovery drum 26 and winds the cleaning belt 24, it is desirable to use a motor which can generate a high torque at a low speed. For this purpose, it is recommended to use, for example, a variable speed ultrasonic motor having a revolution speed of 0 to 100 r.p.m.

The cleaning belt 24 wound around the feed drum 25 is pulled out from the feed drum 25 and passes around the guide rollers 29, 272 and 271 and is rewound around the recovery drum 26.

Preferably, a cleaning belt 24 may be a "clean" belt (corresponding to a cleanliness classes of 100) made of a paper or cloth in which an abrasion loss is small and floating dust is hardly generated. As a clean belt made of a paper, it is recommended to use, for example, "Bemliese" (made by Asahi Chemical Industry Co., Ltd.), "Bellclean" (made by Kanebo, Ltd.) or the like. As a clean belt made by a cloth, it is recommended to use "Toraysee" (made by Toray Industries, Inc.) or the like.

Further, the cleaning belt 24 desirably cleans the disks as many as possible per unit length of the belt 24. However, taking into account an installation space and a movable range of the elevating apparatus, it is recommended to use a roll-type cleaning belt having a width of 10 to 100 mm, preferably, 20 to 80 mm and a length of 1 to 200 m, preferably, about 10 to 100 m.

At the preparing step, one disk 11 on which surface a dye layer has been formed is set onto the cleaning table 12, the virgin portion of the cleaning belt 24 is fed, and solvent supply pump 21 is operated, so that a predetermined quantity of solvent is supplied to the virgin portion of the cleaning belt 24 through the solvent supply pipe 222.

After completion of such a preparing step, the work table is moved along the guide bars 161 and 162. Thereby the cylindrical outer surface of the disk 11 comes into contact with the cleaning belt 24 between the guide rollers 271 and 272, the cleaning table 12 starts to rotate, the cleaning of the cylindrical outer surface of the disk 11 being started, and the organic materials such as dye or the like deposited is removed.

Or, alternatively, the cleaning table 12 might be started to rotate before coming into contact.

When unused fresh (virgin) portion is to be used, the elevating table 23 is elevated up to the highest position, so that the cylindrical outer surface of the disk 11 is cleaned by the track at the lowest position (the first track) of the belt 24.

After completion of the process of one disk 11 using the first track of the belt 24, the elevating table 23 is slightly lowered down and the second track from the bottom of the cleaning belt 24 is used for cleaning. In a manner similar to the above, the entire track up to the top portion of the cleaning belt 24 is effectively utilized.

When the whole track of the cleaning belt 24 is used, the cleaning belt recovery drum 26 again is rotated to feed an unused new portion of the belt. Therefore, the cleaning belt 24 is fed by only a predetermined length and at the same time the elevating table 23 is again elevated up to the highest position, so that the lowest track of the new portion of the cleaning belt 24 may by used for cleaning.

It is recommended to move the cleaning belt 24 also at a low speed during the cleaning of one disk 11 for a further complete cleaning.

In such a case, in order to make full use the cleaning belt 24, after one disk 11 was cleaned and before the next disk is cleaned, it is necessary to lower down the elevating table 23 and at the same time to rewind the cleaning belt 24.

In this embodiment, the cleaning belt 24 is sequentially used from the track at the lowest position toward the upper position instead of from the top position. This is because since the supplied solvent flows down together with the organic materials, it is desirable to prevent the unused clean portion of the cleaning belt 24 from coming in contact with the washed organic materials.

The feeding operation of the cleaning belt 24 is controlled by the central operating unit (not shown).

The pressure applying member 30 is made of a rectangular parallelepiped flexible material such as urethane rubber and presses the cleaning belt 24 by the air cylinder 31, thereby allowing the cleaning belt 24 to be pressed against the guide roller 29.

The pressure applying member 28 is preferably made of a soft raw material having a flexibility enough to buffer an external force and a porosity enough to absorb the supplied solvent. The member 28 allows a contact pressure between the cylindrical outer surface of the disk 11 and the cleaning belt 24 to be held in a predetermined allowable range.

Since the disk 11 is put and held on the cleaning table 12 by the vacuum chuck, its holding force is not so large. Therefore, the pressing force of the member 28 is so controlled that the disk does not make an undesired move on the cleaning table 12.

When the cleaning is made for a predetermined time and organic materials have been completely removed from the cylindrical outer surface of the disk 11, the work table is returned to the original position and the disk is exchanged to a new disk for another cleaning. Thus, a same cycle is repeated automatically.

As for solvent used in the present invention, an arbitrary solvent can be used so long as it is capable of solving the deposited organic materials. The usable solvent is not necessarily limited to the solvent which is substantially incapable of dissolving the substrate. Such a solvent capable of dissolving part of the substrate is also usable.

As a solvent, any one of the organic solvents such as hydrocarbons, halogenated hydrocarbons, alcohols, ethers, ketons, esters, and the like which can easily dissolve the pigment as deposited materials of the like may be selected.

As a solvent, it is generally recommended to use a solvent which is incapable of dissolving the substrate. However, in some cases, cleaning becomes more effective by dissolving part of the substrate. Therefore, a solvent which is capable of dissolving part of the substrate can be used.

Ordinarily, polycarbonate is used as a substrate of the optical disk. As solvents which are incapable of dissolving a substrate, aliphatic or alicyclic hydrocarbons such as hexane, octane, cyclohexane, methylcyclohexane, dimethylcyclohexane, ethylcyclohexane, etc., and alcohols such as methyl alcohol, ethyl alcohol, butyl alcohol, etc., and ethers such as, diethylether, dibutylether can be mentioned. As solvents which are capable of dissolving part of such a substrate, solvents such as aromatic hydrocarbons, halogenated hydrocarbons, ketons, esters, etc. can be mentioned. Any one of those solvents can be used to carry out the present invention.

It is recommended that the apparatus according to the present invention is installed on a disk conveying path from an automatic spin coater.

MANUFACTURING TEST

An organic dye layer made of phthalocyanine was formed on the surface of the polycarbonate substrate with grooves having a diameter of 120 mm and thickness of 1.2 mm by the spin coating method.

Organic materials are deposited and remain like a thin layer on the cylindrical outer surface of the disk.

The disk as mentioned above was set on the cleaning table and was rotated at a high speed, while the solvent was dropped down onto the outermost periphery, thereby dissolving and removing the organic dye layer on the outermost periphery of the disk surface.

On the outermost periphery of the disk surface, the organic dye layer was removed like a ring having a width of about 1.5 mm. However, the remaining organic materials on the cylindrical outer surface were not removed.

Subsequently, the cylindrical outer surface of the disk was cleaned by the apparatus shown in FIG. 2 by using the cleaning belt having a width of 6 cm and a length of 70 m.

"Bemliese PO-500" was used as a cleaning belt.

The remaining organic materials on the cylindrical outer surface of the disk were completely removed. Even if the side surface of the disk was touched by the fingers, traces of organic materials were unable to be found on the fingers.

Subsequently, gold was sputtered onto the organic dye layer to form a reflective layer. Further, a protective layer of an ultraviolet curable resin was formed on the reflective layer. Thus, as many as 25,000 optical recording media were manufactured.

After full inspection, all the media thus obtained were proved to be high qualified media with no-defect and with an excellent adhesion between the protective film and the substrate.

The scope of the present invention is not limited to the above embodiment. For example, in the above embodiment, the cleaning belt is stopped during the cleaning work. After completion of one cleaning, the cleaning table is elevated up or down, thereby enabling the clean portion to be used in the next cleaning. However, in another embodiment, it is also possible to elevate slowly up or down the elevation table or the move continuously the cleaning belt during cleaning. It is also recommended to clean a plurality of disks simultaneously. Further, in another embodiment, the apparatus might be a multihead type. Moreover, further embodiments of solvent supplying devices can be a spray type, dropping type, capillary sucking type, wet roller type, or the like. The apparatus itself may be also constructed as a lateral axis type instead of a vertical axis type. When the disk comes into contact with or moves away from the cleaning belt, in place of moving the cleaning table, the elevation table 23 or guide rollers 271 and 272 can be also moved. Further, there is also a case where grooves adapted to the outer peripheral shape of the disk may be formed on the side surface of the pressure applying member and the present invention includes all of those modifications.

According to the present invention, the cleaning of the side surface of the disk can be made automatically. The quality can be perfectly controlled. According to the present invention, it is also possible to make a remarkable reduction of labor and production costs. Moreover, tens of thousands of disks can be cleaned by one belt.

On the other hand, since the apparatus according to the present invention can be operated fully automatically as a closed system, the solvent, dye and the like can be completely recovered, making the apparatus highly clean.

What is claimed is:

1. A method of cleaning a cylindrical outer surface of a disk which comprises a substrate having an organic dye layer on its surface for manufacturing an information recording medium, the method comprising the steps of:

mounting a disk on a rotatable cleaning table;

feeding a long cleaning belt along a desired path in its longitudinal direction toward a cylindrical outer surface of the disk such that a first virgin portion of the cleaning belt faces the cylindrical outer surface of the disk;

supplying a solvent which is capable of dissolving organic materials which forms the organic dye layer to the first virgin portion of the cleaning belt;

contacting the cylindrical outer surface of the disk while the disk is rotating with the first virgin portion of the cleaning belt which is supplied with said solvent to remove the organic material from the cylindrical outer surface of the disk; and removing the disk from the cleaning table;

wherein said first virgin portion of the belt is at a lower portion of said belt, such that after the cleaning of one disk is completed the method comprises the further steps of:

placing a further disk on said cleaning table;

lowering the cleaning belt such that a second virgin portion of the cleaning belt faces a cylindrical outer surface of the further disk;

supplying the solvent to the second virgin portion of the cleaning belt; and contacting the cylindrical outer surface of the further disk while the further disk is rotating with the second virgin portion of the cleaning belt which is supplied with said solvent to remove organic material from the cylindrical outer surface of the further disk.

2. A method of cleaning the cylindrical outer surface of the disk according to claim 1, wherein said cleaning belt is made from paper or cloth.

3. A method of cleaning the cylindrical outer surface of the disk according to claim 1, wherein a solvent which is not capable dissolving the substrate is used as said solvent.

4. A method of cleaning the cylindrical outer surface of the disk according to claim 1, wherein a solvent which is not capable of dissolving part of the substrate is used as said solvent.

5. A method of cleaning the cylindrical outer surface of the disk according to claim 1, wherein the organic materials are removed away while the cleaning belt is stopped.

6. A method of cleaning the cylindrical outer surface of the disk according to claim 1, wherein the organic materials are removed away while the cleaning belt is continuously being moved in the longitudinal direction.

7. A method of cleaning the cylindrical outer surface of the disk according to claim 1, wherein said feeding step comprises the step of intermittently moving the cleaning belt along said desired path.

8. A method of cleaning the cylindrical outer surface of the disk according to claim 1, wherein said feeding step comprises the step of continuously moving the cleaning belt along said desired path.

* * * * *